United States Patent
Lehmann et al.

(10) Patent No.: US 7,866,449 B2
(45) Date of Patent: Jan. 11, 2011

(54) MAGNETIC RAIL BRAKE DEVICE

(75) Inventors: Henry Lehmann, Hinterbrühl (AT); Herrmann Koidl, Vienna (AT); Lothar Schmied, Mödling (AT); Richard Rathhammer, Grub (AT); Stefan Haas, Mödling (AT)

(73) Assignee: Knorr-Bremse Systeme Für Schienenfahrzeuge GmbH, Munich (DE)

( * ) Notice: Subject to any disclaimer, the term of this patent is extended or adjusted under 35 U.S.C. 154(b) by 907 days.

(21) Appl. No.: 11/578,244

(22) PCT Filed: Apr. 13, 2005

(86) PCT No.: PCT/EP2005/003884
§ 371 (c)(1),
(2), (4) Date: May 18, 2007

(87) PCT Pub. No.: WO2005/100122

PCT Pub. Date: Oct. 27, 2005

(65) Prior Publication Data
US 2010/0116602 A1 May 13, 2010

(30) Foreign Application Priority Data
Apr. 14, 2004 (DE) .................. 10 2004 018 009

(51) Int. Cl.
*B60L 7/00* (2006.01)
(52) U.S. Cl. ........................................ 188/165; 188/33

(58) Field of Classification Search ................. 188/161, 188/165, 41, 33, 34, 158, 160, 164
See application file for complete search history.

(56) References Cited

U.S. PATENT DOCUMENTS

| | | | |
|---|---|---|---|
| 4,144,954 A | 3/1979 | Farello et al. | |
| 6,953,107 B2 | 10/2005 | Lehmann et al. | |
| 2007/0284199 A1* | 12/2007 | Lehmann et al. | 188/165 |
| 2010/0101898 A1* | 4/2010 | Kassan et al. | 188/41 |

FOREIGN PATENT DOCUMENTS

| | | |
|---|---|---|
| DE | 457 672 | 1/1926 |
| DE | 469 614 | 1/1926 |
| DE | 27 08 399 A1 | 4/1978 |
| DE | 101 11 685 A1 | 12/2002 |
| FR | 78 12179 A1 | 4/1978 |

OTHER PUBLICATIONS

"Basics of Brake Technology," Knorr-Bremse Special Library, 2nd Ed., 2003.

\* cited by examiner

*Primary Examiner*—Melanie Torres Williams
(74) *Attorney, Agent, or Firm*—Barnes & Thornburg LLP

(57) ABSTRACT

The invention relates to a magnetic rail brake device of a railway vehicle, including a magnetic base or carrier element, and a magnetic coil which can be connected to a voltage source by means of a connecting mechanism that is on the base or carrier element and is provided with at least two electrical terminals. An end face of the connecting mechanism is disposed within an imaginary enveloping area of the base or carrier element.

6 Claims, 2 Drawing Sheets

MAGNETIC RAIL BRAKE DEVICE

PRIOR ART

The invention relates to a magnetic rail brake device of a rail vehicle having a magnetic base or carrier body, a magnet coil, and a connecting device on the base or carrier body and having at least one electrical connection to connect the coil to a voltage source. The connecting device is arranged at an end face within an imaginary enveloping area of the base or carrier body.

A magnetic rail brake is disclosed, for example, in DE 101 11 685 A1. The force-generating main component of an electrical magnetic rail brake is the braking magnet. In principle, it is an electromagnet, comprising a magnet coil extending in the rail direction and a magnet core, which is similar to a horseshoe and forms the base or carrier body. The direct current flowing in the magnet coil produces a magnetic voltage, which induces a magnetic flux in the magnet core. The magnetic flux is short-circuited via the rail head as soon as the braking magnet rests on the rail. As a result, a magnetic attraction force is brought about between the braking magnet and the rail. Owing to the kinetic energy of the moving rail vehicle, the magnetic rail brake is pulled along the rail via drivers. In this case, a braking force is produced by the sliding friction between the braking magnet and the rail in conjunction with the magnetic attraction force. The extent of the braking force of a magnetic rail brake is dependent, inter alia, on the reluctance of the magnetic circuit, i.e., the geometry and permeability, the current linkage, the friction value between the braking magnet and the rail and the rail state.

In principle, it is possible to distinguish between two different types of magnets in terms of the structural design. In a first embodiment, the braking magnet is a rigid magnet, to which two wearing strips are screwed which is separated by a nonmagnetic strip in the longitudinal direction. This serves the purpose of avoiding a magnetic short circuit within the braking magnet. Rigid magnets are usually used for local transport in streetcar systems and city railroads.

Furthermore, link magnets are known, in the case of which the coil former does not have a continuous, rigid steel core, but has open chambers between the steel cores split off merely by partition walls. Intermediate elements, which can move during the braking process, are inserted into the individual chambers. They can thus follow uneven sections on the rail head. End pieces are rigidly screwed to the coil former. Link magnets are used as standard in the standard-gage railroad sector. In relation to the embodiments of magnetic rail brakes, reference is made to the publication "Grundlagen der Bremstechnik" [Fundamentals in braking technology], pages 92 to 97 by Knorr-Bremse A G, Munich, 2003.

The magnet coil is connected to a voltage source by a connecting device, which is held by the base or carrier body and has in each case one pin-shaped connection for the positive and negative terminal. The known magnetic rail brakes have connecting devices which have an elongate cable branch flange, which is fixed in an upper region of the base or carrier body parallel to said body and away from which the two connections protrude in the opposite direction. Other designs have upwardly or laterally protruding connections, which in any case protrude markedly beyond the boundary of the magnet. One disadvantage with these arrangements of the connecting device is the fact that the physical space for holding elements which are fixed above or laterally on the base or carrier body, for example drivers or track holders, is restricted or the vehicle boundary profile is impaired. Furthermore, such a magnetic rail brake has a relatively large design.

A generic magnetic rail brake device is known from DE 27 08 399 A1. Therein, the connecting device is arranged at the front on the base or carrier body, but the physical space is very restricted in the region of the connecting device, for example for attachment parts.

OBJECT OF THE INVENTION

The object of the invention is therefore to develop a magnetic rail brake of the type mentioned at the outset which has a more compact design.

ADVANTAGES OF THE INVENTION

Owing to the fact that provision is made for the connecting device to be arranged at an end face, within an imaginary enveloping area of the magnetic base or carrier body, the magnetic rail brake has a very compact design, in particular as regards its width and height. Furthermore, the connecting device is arranged beneath a longitudinal axis of gravity of the magnet coil. Then, there is sufficient physical space laterally and/or in the upper region of the base or carrier body for holding elements or attachment parts which need to be attached there.

The connecting device is particularly preferably arranged at the front on the base or carrier body. Then, the fixing strips, with which the base or carrier body is fixed to attachment parts, can be continuous instead of having a split design as in the prior art, which entails an advantageously higher load-bearing capacity and degree of rigidity.

The connecting device is arranged above an end piece, which extends in the longitudinal direction, of the base or carrier body, but the connecting device does not protrude beyond the end piece.

Such horn-shaped end pieces, as described in UIC 541, are bent back slightly upwards in relation to a base surface of the base or carrier body and as a result make it possible to slide over points evenly. The physical space which until now has not been used but is provided in any case above these end pieces is therefore used in an advantageous manner for accommodating the connecting device without increasing the physical length of the magnetic rail brake.

BRIEF DESCRIPTION OF THE DRAWINGS

The invention will be illustrated by way of example below with reference to the drawings, in which.

DESCRIPTION OF THE EXEMPLARY EMBODIMENTS

Figure 1:
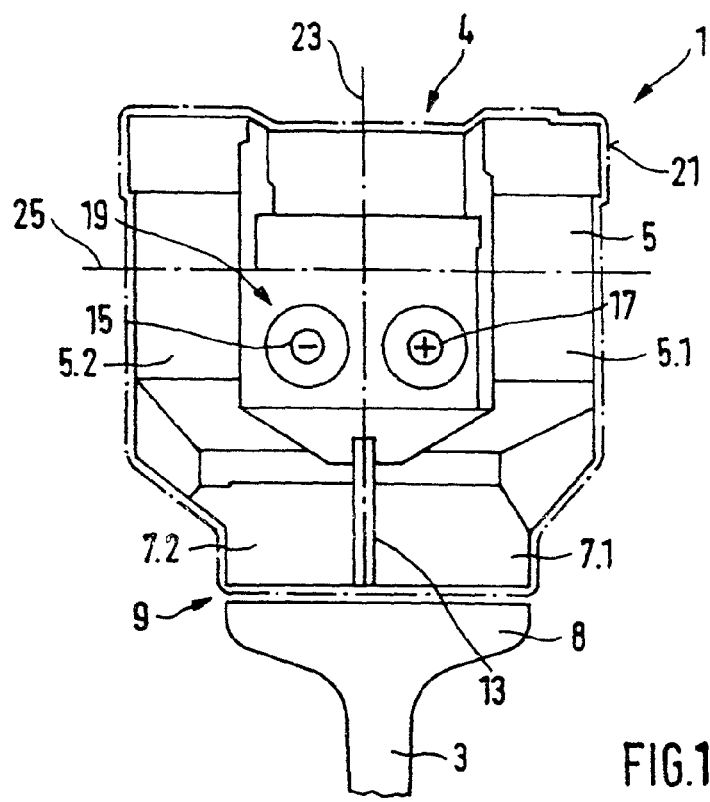
FIG. 1 shows a front view of a magnetic rail brake in accordance with one preferred embodiment

The preferred embodiment of a magnetic rail brake 1 shown in FIG. 1 includes a magnet coil 4, which extends in the longitudinal direction of a rail 3 and is not visible from the outside, and a magnet core or base or carrier body 5, whose limbs 5.1 and 5.2 run parallel to one another. Pole shoes 7.1, 7.2 are arranged on the limbs 5.1 and 5.2. An air gap 9 is formed between the pole shoes 7.1, 7.2 and a rail head 8 of the rail. The pole shoes 7.1, 7.2 preferably consist of a friction material, for example steel, nodular cast iron or sintered materials. A nonmagnetic, wear-resistant, impact-resistant and thermally resistant intermediate strip 13 can be arranged in an intermediate space between the left-hand and the right-hand pole shoe 7.1, 7.2 (magnetic north or south pole) so as to fill the intermediate space.

Furthermore, a connecting device 19 having at least two electrical connections 15, 17 for the positive and negative terminals of a voltage source is provided. The connecting device 19 is arranged at an end face of the base or carrier body within an imaginary enveloping area 21 of the magnetic base or carrier body 5. The enveloping area 21 should be understood to mean the end face protrusion of the outer sheathing surface or cross-sectional outer contour of the base and/or carrier body 5. Within the imaginary enveloping area 21 of the magnetic base or carrier body 5 means that the connecting device 19 essentially does not protrude or no section of it protrudes beyond the enveloping area 21.

As can be seen in FIG. 1, the two electrical connections 15, 17 (negative terminal and positive terminal) are arranged symmetrically, for example, with respect to a vertical central plane 23 of the base or carrier body 5. However, they can also both be located on one side in relation to this vertical central plane 23, as illustrated in the embodiment in FIG. 2.

Figure 2:
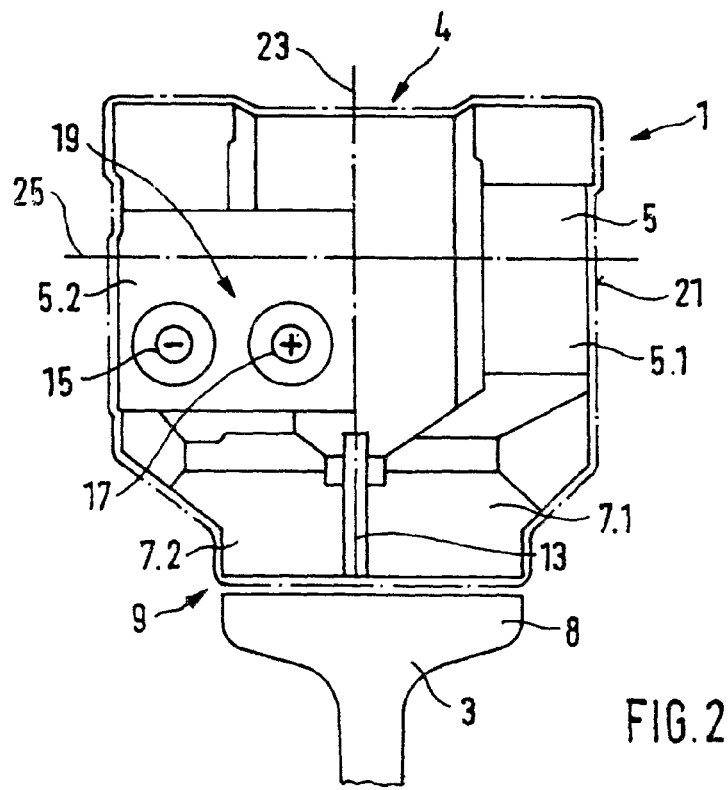
FIG. 2 shows a front view of a magnetic rail brake in accordance with another embodiment.

The connecting device 19 is shown arranged beneath a longitudinal axis of gravity 25 of the magnet coil 4, in both embodiments shown in FIGS. 1 and 2. In particular, the connecting device is formed by at least one terminal box 19, which consists of a diamagnetic or paramagnetic material and is connected to the base or carrier body 5.

Figure 3:
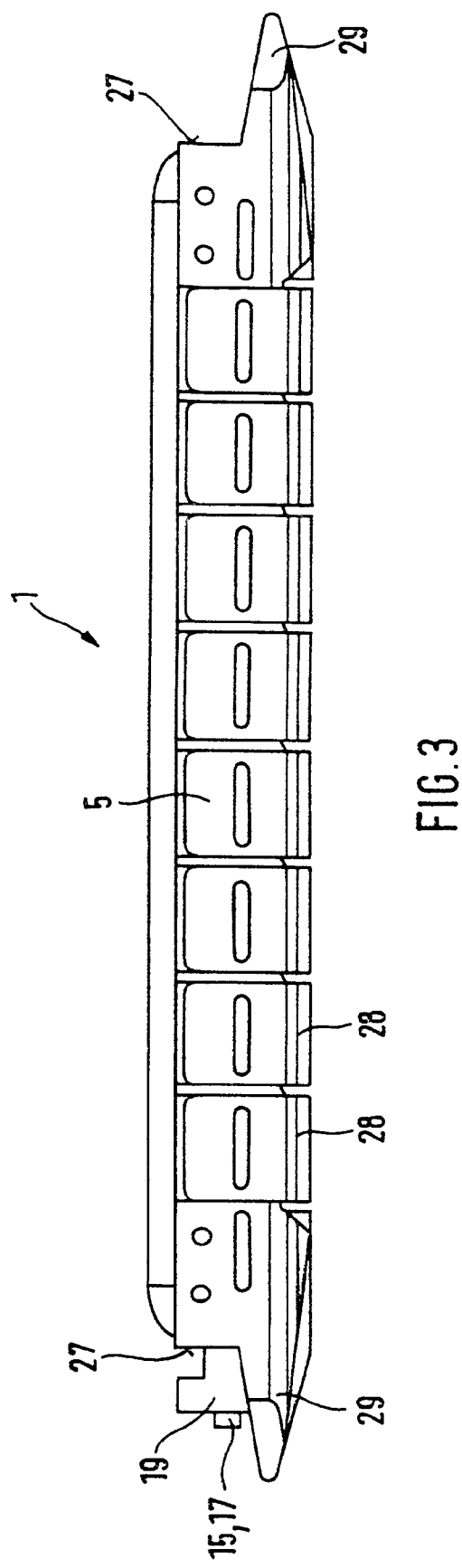
FIG. 3 shows a side view of the magnetic rail brake of FIG. 1.

In accordance with one development shown in FIG. 3, the connecting device 19 can be formed by a terminal box 19, which is held on an end face 27 of the base or carrier body 5 and away from which the two electrical connections 15, 17 protrude in the direction of the longitudinal extent of the base or carrier body 5. In FIG. 3, a magnetic rail brake 1 with intermediate elements 28 is shown. In particular, provision may then be made for the connecting device 19 to be arranged above an end piece 29, which extends in the longitudinal direction, of the base or carrier body 5, but does not protrude beyond the body 5. Electrical connections 15, 17 can also be provided, if necessary, on both ends instead of only on one front face 27. In such case only one electrical connection would be provided at each end face.

What it claimed is:

1. A magnetic rail brake device for a rail vehicle comprising:
    a magnetic base or carrier body;
    a magnet coil;
    a connecting device on the base or carrier body electrically connected to the coil and having at least one electrical connection to be connected to a voltage source;
    the connecting device being arranged at an end face of the base or carrier body within an imaginary enveloping area of the base or carrier body; and
    the connecting device being arranged beneath a longitudinal axis of gravity of the magnet coil.

2. The magnetic rail brake device as claimed in claim 1, wherein the connecting device is arranged above an end piece, which extends in the longitudinal direction, of the base or carrier body, but does not protrude beyond the body in the longitudinal direction.

3. The magnetic rail brake device as claimed in claim 2, wherein the connecting device is formed by at least one terminal box, which consists of a diamagnetic or paramagnetic material and is connected to the base or carrier body.

4. The magnetic rail brake device as claimed in claim 3, wherein the connecting device is arranged at both ends of the base or carrier body and each end has only one electrical connection.

5. The magnetic rail brake device as claimed in claim 2, wherein the connecting device is formed by at least one terminal box which consists of a diamagnetic or paramagnetic material and is connected to the base or carrier body.

6. The magnetic rail brake device as claimed in claim 1, wherein the connecting device is arranged at both ends of the base or carrier body and each end has only one electrical connection.

* * * * *